(12) United States Patent
Anderson et al.

(10) Patent No.: US 10,618,435 B2
(45) Date of Patent: Apr. 14, 2020

(54) INFANT CARRIER

(71) Applicant: Dorel Juvenile Group, Inc., Foxboro, MA (US)

(72) Inventors: Robert S. Anderson, Narvon, PA (US); David A. Lehman, Lancaster, PA (US); Mei-Hui Lin, Nashville, IN (US)

(73) Assignee: Dorel Juvenille Group, Inc., Foxboro, MA (US)

( * ) Notice: Subject to any disclaimer, the term of this patent is extended or adjusted under 35 U.S.C. 154(b) by 204 days.

(21) Appl. No.: 15/685,442

(22) Filed: Aug. 24, 2017

(65) Prior Publication Data

US 2018/0056823 A1 Mar. 1, 2018

Related U.S. Application Data

(60) Provisional application No. 62/379,527, filed on Aug. 25, 2016.

(51) Int. Cl.
*B60N 2/28* (2006.01)

(52) U.S. Cl.
CPC ......... *B60N 2/2821* (2013.01); *B60N 2/2806* (2013.01); *B60N 2/2845* (2013.01); *B60N 2/2863* (2013.01); *B60N 2/2875* (2013.01); *B60N 2/2857* (2013.01)

(58) Field of Classification Search
CPC .. B60N 2/2821; B60N 2/2845; B60N 2/2863; B60N 2/2875; B60N 2/2806; B60N 2/2857
USPC .......... 297/256.16, 183.2, 183.3, 130, 183.6, 297/183.1, 183.4, 184.17, 250.1
See application file for complete search history.

(56) References Cited

U.S. PATENT DOCUMENTS

| | | | |
|---|---|---|---|
| 4,743,063 A | 5/1988 | Foster, Jr. | |
| 4,984,845 A | 1/1991 | Knoedler et al. | |
| 6,224,148 B1* | 5/2001 | Lee | A47D 1/004 297/118 |
| 6,692,073 B1* | 2/2004 | Weathersby | B60N 2/2806 297/256.13 |
| 9,028,006 B2* | 5/2015 | Yi | A47D 1/00 297/487 |
| 2010/0123341 A1* | 5/2010 | Furman | A47D 13/105 297/217.4 |
| 2011/0062752 A1 | 3/2011 | Kho et al. | |
| 2011/0298257 A1 | 12/2011 | Abadilla et al. | |
| 2013/0009428 A1 | 1/2013 | Heisey | |
| 2014/0361589 A1* | 12/2014 | Hou | B60N 2/2824 297/256.16 |
| 2015/0329015 A1 | 11/2015 | Forbes | |

FOREIGN PATENT DOCUMENTS

FR 2902066 12/2007

OTHER PUBLICATIONS

International Search Report and Written Opinion, International Application No. PCT/US2017/048369, dated Nov. 17, 2017, 12 pages.

* cited by examiner

*Primary Examiner* — Milton Nelson, Jr.
(74) *Attorney, Agent, or Firm* — Barnes & Thornburg LLP (57) ABSTRACT

A child restraint includes an infant carrier and a handle coupled to the infant carrier. The handle is mounted for movement relative to the infant carrier.

9 Claims, 7 Drawing Sheets

INFANT CARRIER

PRIORITY CLAIM

This application claims priority under 35 U.S.C. § 119(e) to U.S. Provisional Application No. 62/379,527, filed Aug. 25, 2016, which is expressly incorporated by reference herein.

BACKGROUND

The present disclosure relates to child restraints, and particularly to child restraints that are used to restrain infant children. More particularly, the present disclosure relates to infant carriers that can be mounted on a base in a vehicle and that can be separated from the base and used by a caregiver to carry the infant away from the vehicle.

SUMMARY

A child restraint in accordance with the present disclosure includes an infant carrier. In illustrative embodiments, the infant carrier can be mounted on a stationary carrier-support base that is anchored to a passenger seat in a vehicle to restrain an infant during transport in the vehicle. The infant carrier also can be separated from the base to allow a caregiver to carry the infant away from the vehicle using a handle included in the infant carrier.

In illustrative embodiments, the infant carrier includes a seat bucket sized to receive an infant and a short-height carry handle coupled to the seat bucket. The seat bucket is configured to mate with the carrier-support base so that the infant carrier can be used in a vehicle. After the seat bucket is separated from the carrier-support base and removed from the vehicle, a caregiver can use the short-height carry handle to move the seat bucket and transport an infant in the seat bucket away from the vehicle.

In illustrative embodiments, the short-height carry handle includes a low-profile carry strap that is arranged to pivot between closed and opened positions about a pivot axis that extends generally along one of the side walls of the seat bucket between front and rear ends of the seat bucket. In the closed infant-carrying position, the low-profile carry strap is arranged to extend from the left side of the seat bucket over an infant-receiving space formed in the seat bucket to the right side of the seat bucket. In the opened infant-receiving position, the low-profile carry strap is arranged to extend in a direction away from the left and right sides of the seat bucket so that it is an easy matter for a caregiver to place an infant in the infant-receiving space formed in the seat bucket.

In illustrative embodiments, the short-height carry handle further includes a first strap mount adapted to mate with a first side of a carrier shell included in the seat bucket, a hinge coupled to the first strap mount to establish the pivot axis, and a second strap mount adapted to mate with an opposite second side of the carrier shell. The low-profile carry strap includes a first end coupled to the hinge and an opposite second end coupled to a buckle also included in the short-height carry handle. The low-profile carry strap cooperates with the buckle to form a pivotable seat-bucket lifter that can be (1) used by a caregiver to lift and transport the seat bucket when the low-profile carry strap is retained in the closed infant-carrying position and (2) pivoted by a caregiver about the pivot axis after release of the buckle from the second strap mount to allow the caregiver to move the low-profile carry strap laterally to the opened infant-receiving position.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed disclosure particularly refers to the accompanying figures in which:

FIG. 1 is a perspective view of an infant carrier in accordance with the present disclosure, with portions of the exterior padding broken away, showing that the infant carrier includes a seat bucket comprising a carrier shell along with interior and exterior padding for the carrier shell and showing that the infant carrier also includes a short-height carry handle coupled at each end to the seat bucket to allow a caregiver to carry the seat bucket using the short-height carry handle and showing that the short-height carry handle includes a hinge establishing a lifter-pivot axis along a left side of the seat bucket and a pivotable seat-bucket lifter comprising a low-profile carry strap and a buckle coupled to a far end of the low-profile carry strap and showing the low-profile carry strap pivotable seat-bucket lifter in a closed infant-carrying position in which the low-profile carry strap extends at a relatively low elevation from the left side of the seat bucket to the right side of the seat bucket above an infant-receiving space formed in the seat bucket;

FIG. 3 is an exploded perspective view of components comprising the infant carrier of FIGS. 1 and 2 showing that the short-height carry handle comprises a wide and shallow U-shaped low-profile carry strap made of a softgoods material, a hinge associated with a first end of the low-profile carry strap, a first strap mount adapted to mate with a first (left) side wall of the underlying carrier shell, a buckle associated with an opposite second end of the low-profile carry strap, and a multi-part second strap mount adapted to mate with a second (right) side wall of the underlying carrier shell and to releasably mate with the buckle to establish the closed infant-carrying position of the low-profile carry strap as suggested in FIG. 1 and showing that in an illustrative embodiment the interior padding for the carrier shell is an infant-support nest comprising, in series, a body-support pad having a seat bottom and a seat back extending upwardly from the seat bottom, a first side pad formed to include a first strap-mount cutout, a front pad formed to include spaced-apart belt-receiver slots, and a second side pad formed to include a second strap-mount cutout and showing that in an illustrative embodiment the exterior padding for the carrier shell is a cummerbund;

DETAILED DESCRIPTION

Figures 1, 2:
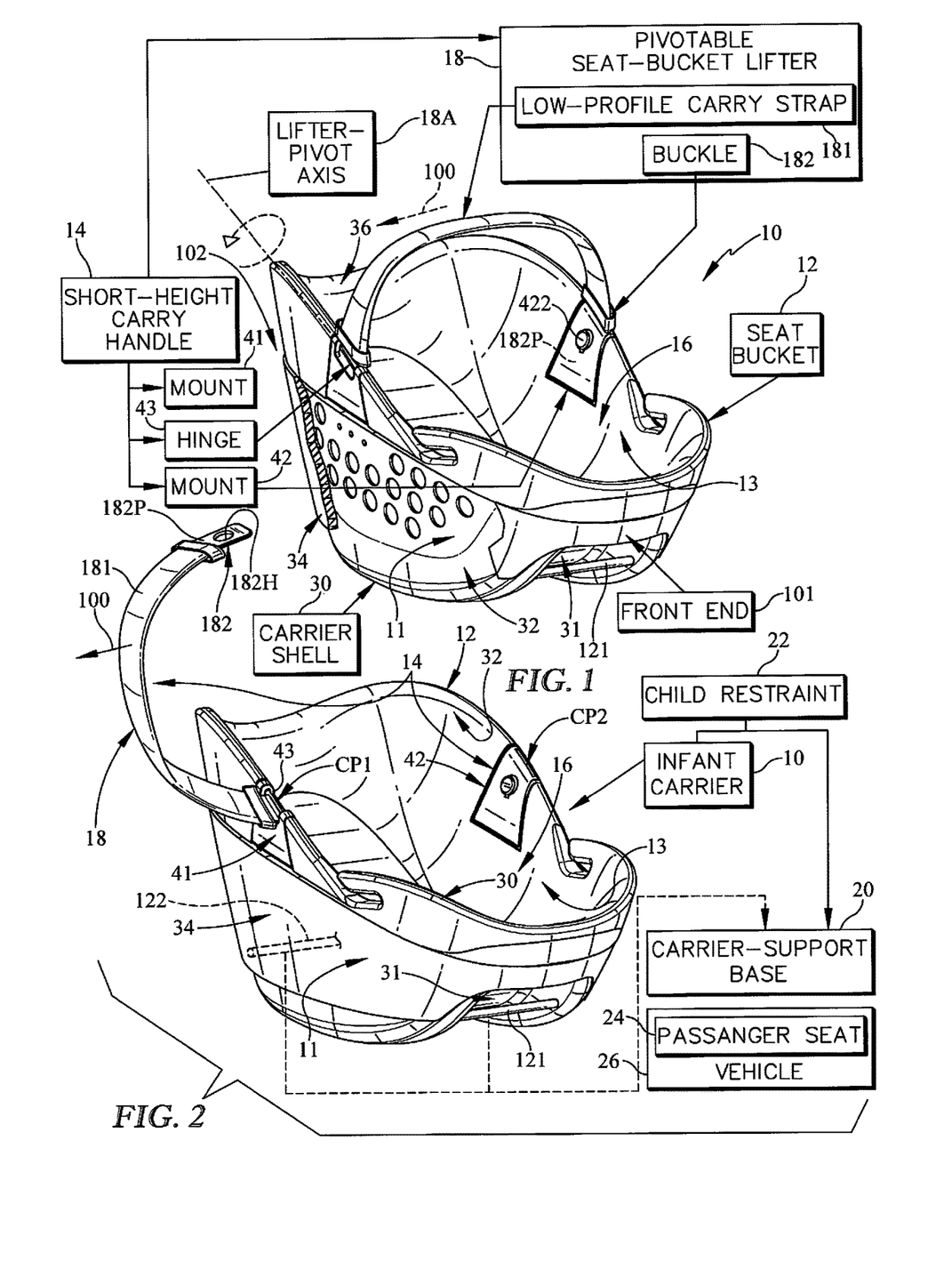
FIG. 2 is a view similar to FIG. 1 after release of the buckle to free the buckle for movement relative to and away from the right side of the seat bucket and over the infant-receiving space formed in the seat bucket and after movement of the low-profile carry strap of the pivotable seat-bucket lifter by a caregiver about the lifter-pivot axis from the closed infant-carrying position shown in FIG. 1 to an opened infant-receiving position and showing that the low-profile carry strap is arranged to lie in the opened infant-receiving position along the left side of the seat bucket rather that along either the front end or the oppositely facing rear end of the seat bucket.

An infant carrier 10 in accordance with the present disclosure includes a seat bucket 12 and a short-height carry handle 14 as suggested in FIG. 1. Seat bucket 12 is formed to include an infant-receiving space 16 sized to receive an infant (not shown) during use of infant carrier 10. Short-height carry handle 14 has a relatively short elevation profile relative to seat bucket 12 as suggested in FIGS. 9 and 10 and includes a pivotable seat-bucket lifter 18 that has a low-profile carry strap 181 which can be pivoted by a caregiver about a lifter-pivot axis 18A relative to seat bucket 12 from an illustrative closed infant-carrying position shown, for example, in FIG. 1 laterally relative to seat bucket 12 to an illustrative opened infant-seating position shown, for example, in FIG. 2 to make it easy for a caregiver to place an infant in the infant-receiving space 16 of seat bucket 12.

Infant carrier 10 can be mounted on an underlying stationary carrier-support base 20 as suggested diagrammatically in FIG. 2 to form a child restraint 22 for use in a vehicle 26. Carrier-support base 20 can be anchored using any suitable means to a passenger seat 24 in a vehicle 26 as suggested diagrammatically in FIG. 2. Child restraint 22 can be used to restrain an infant (not shown) that is placed in the infant-receiving space 16 of seat bucket 12 during transport in vehicle 26. It is within the scope of the present disclosure to configure child restraint 22 so that a caregiver can separate infant carrier 10 from its companion carrier-support base 20 to free the caregiver to transport the infant in seat bucket 12 away from vehicle 26 using the short-height carry handle 14.

Figure 3:
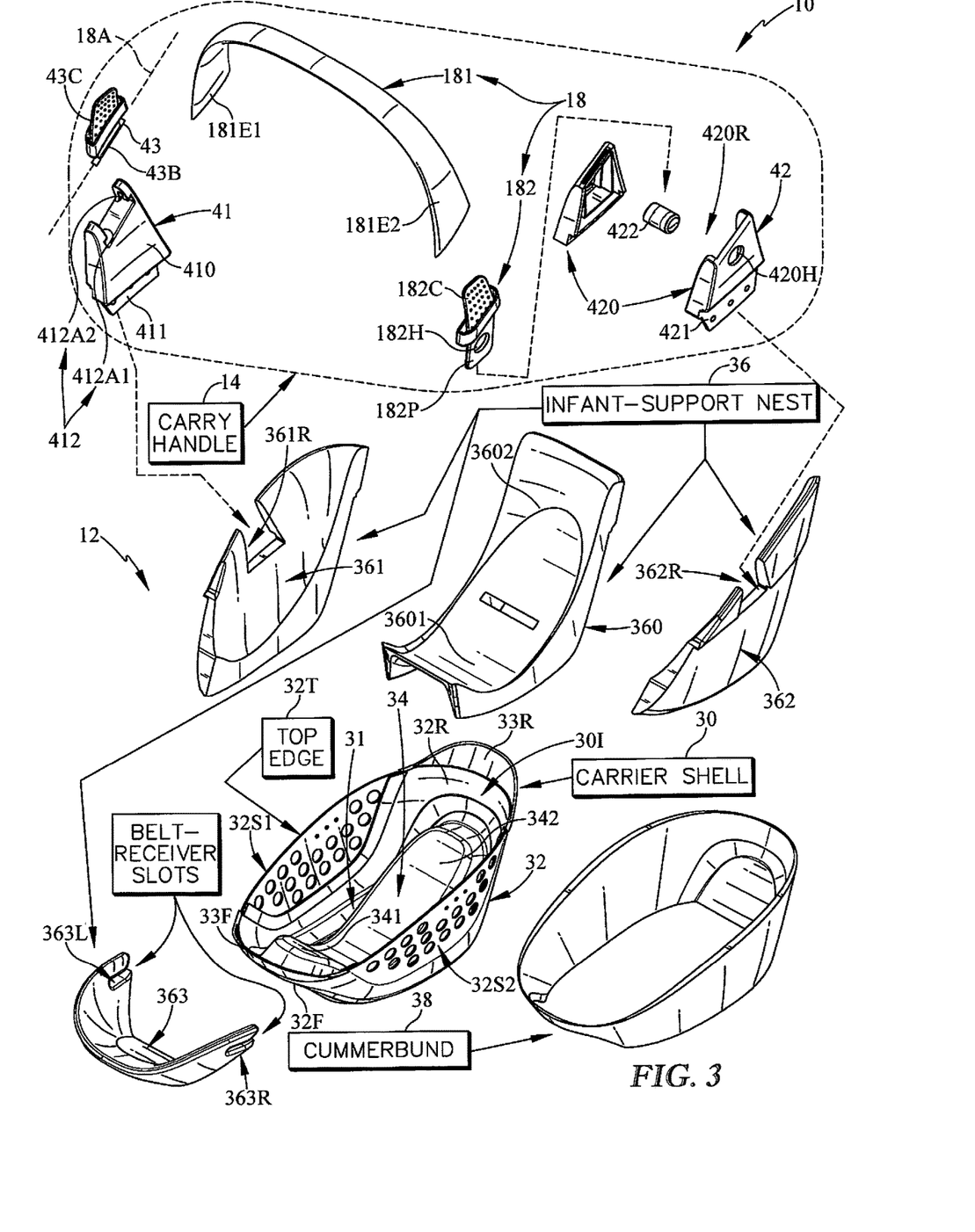

In an illustrative embodiment, seat bucket 12 includes a carrier shell 30, an infant-support nest 36 configured to provide interior padding for carrier shell 30, and a cummerbund 38 configured to provide exterior padding for carrier shell 30 as suggested in FIGS. 1-3. Carrier shell 30 is configured to mate temporarily with the underlying carrier-support base 20 in any suitable manner to assume a stationary mounted position on carrier-support base 20 when seat bucket 12 is used to transport an infant in vehicle 26. In an illustrative embodiment, seat bucket 12 further includes first and second bucket-support attachment rods 121, 122 that are mounted on the underside of carrier shell 30 and configured to mate with carrier-support base 20 as suggested in FIG. 2 to hold seat bucket 12 in a stationary position on carrier-support base 20. Carrier shell 30 is also configured to be separated from the underlying carrier-support base 20 under the control of a caregiver in any suitable manner when the caregiver wishes to use short-height carry handle 14 to transport an infant in seat bucket 12 away from vehicle 26.

Short-height carry handle 14 includes a first (strap) mount 41 coupled to one side portion 32S1 of carrier shell 30 of seat bucket 12, a second (strap) mount 42 coupled to an opposite side portion 32S2 of carrier shell 30 of seat bucket 12, a hinge 43 coupled to first strap mount 41, and the pivotable seat-bucket lifter 18 as suggested in FIGS. 1-3. A first end of pivotable seat-bucket lifter 18 is always coupled to hinge 43 as suggested in FIGS. 1 and 2. An opposite second end of pivotable seat-bucket lifter 18 is configured to be (1) coupled to second strap mount 42 when pivotable seat-bucket lifter 18 is moved by a caregiver to cause low-profile carry strap 181 to assume the closed infant-carrying position as shown, for example, in FIG. 1 and (2) separated from second strap mount 42 when pivotable seat-bucket lifter 18 is pivoted by a caregiver on hinge 43 about lifter-pivot axis 18A to cause low-profile carry strap 181 to assume the opened infant-seating position as shown, for example, in FIG. 2.

Figure 9:
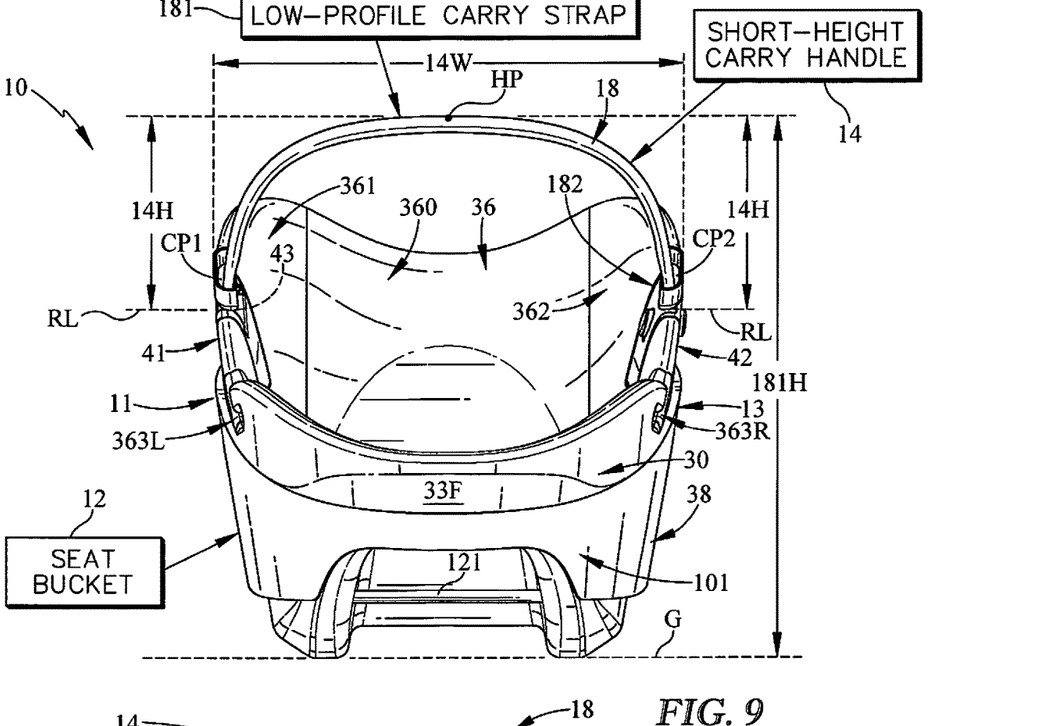
FIG. 9 is a front elevation view of the infant carrier of FIG. 1.
Figure 10:
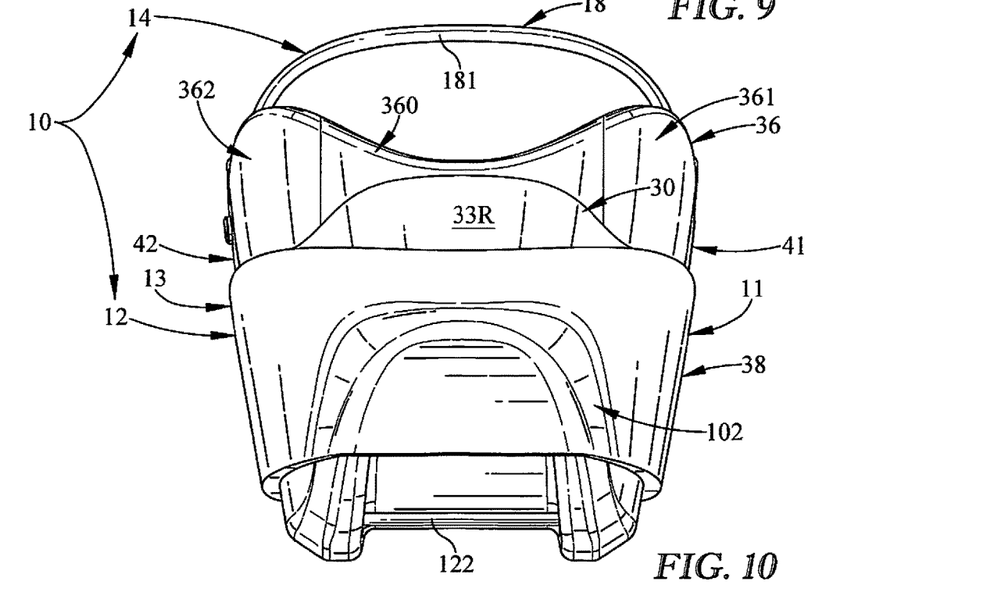
FIG. 10 is a rear elevation view of the infant carrier of FIG. 1.
Figure 11:
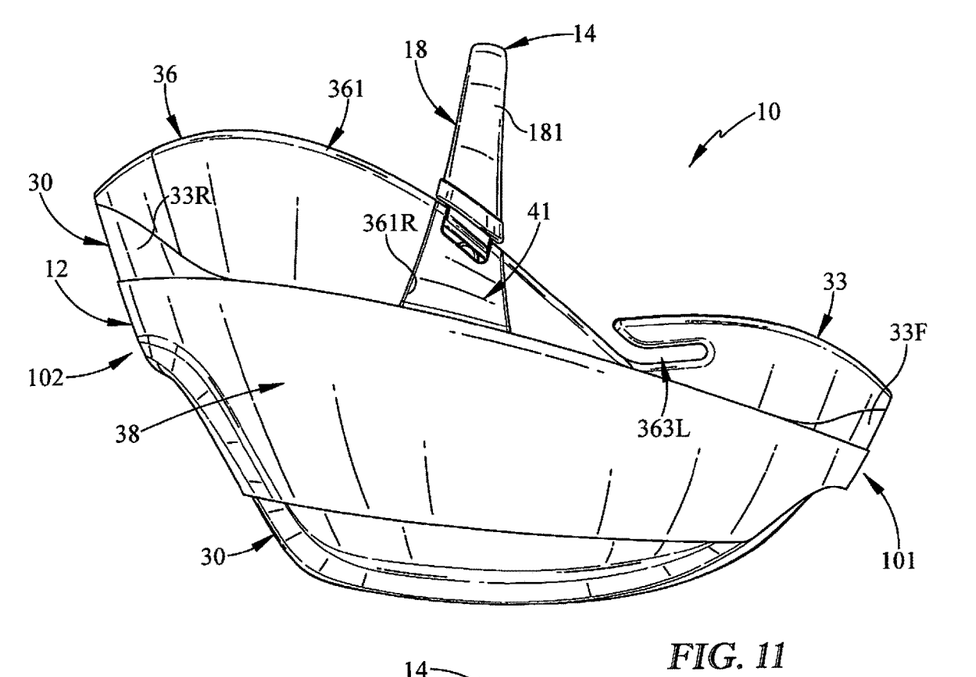
FIG. 11 is a left-side elevation view of the infant carrier of FIG. 1.
Figure 12:
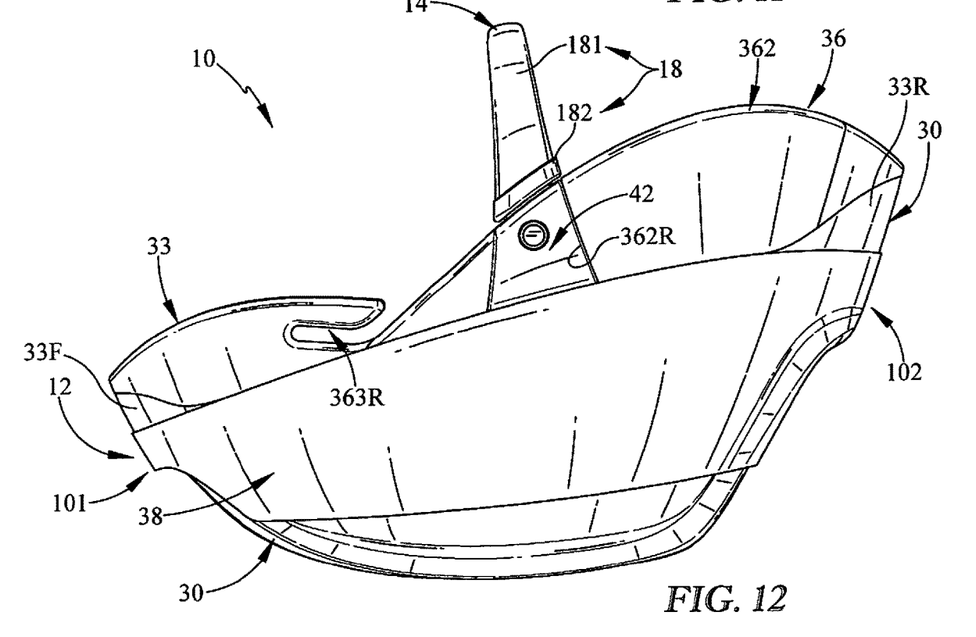
FIG. 12 is a right-side elevation view of the infant carrier of FIG. 1.

In the infant-carrying closed position of low-profile carry strap 181, short-height carry handle 14 has a relatively short elevation profile relative to seat bucket 10 as suggested in FIGS. 1, 9, and 10. As suggested in FIG. 9, short-height carry handle 14 has an effective strap height 14H and an effective strap width 14W that is about 2.4 times greater than the effective strap height 14H in an illustrative embodiment. A measured strap height 181H of the top of low-profile carry strap 181 above the ground G on which seat bucket 12 rests is about 2.7 times greater than the height 14H of short-height carry handle 14 when low-profile carry strap 181 assumes the closed infant-carrying position in the illustrative embodiment shown in FIG. 9. During movement of low-profile carry strap 181 from the closed infant-carrying position to the opened infant-seating position, pivotable seat-bucket lifter 18 is pivoted about lifter-pivot axis 18A to cause low-profile carry strap 181 to move in a lateral side-to-side direction 100 across the width of seat bucket 12 as suggested in FIGS. 1 and 2 rather than a longitudinal center-to-back direction or a longitudinal center-to-front direction (not shown) between front end 101 and rear end 102 of seat bucket 12.

Carrier shell 30 includes a bottom wall 31, an endless side wall 32 extending upwardly from the bottom wall 31 and terminating at a top edge 32T, and upstanding front and rear collars 33F, 33R coupled to endless side wall 32 as suggested in FIG. 3. Carrier shell 30 also includes an infant seat 34 coupled to the bottom wall 31 and front and rear portions 32F, 32R of side wall 32 and arranged to extend upwardly in an interior region 301 bounded by carrier shell 30 as also suggested in FIG. 3. Carrier shell 30 is a monolithic component made of a plastics material in illustrative embodiments.

Side wall 32 of carrier shell 30 is somewhat elliptical when viewed from above as suggested in FIG. 3. Side wall 32 comprises forward portion 32F, rearward portion 32R, and first and second side portions 32S1, 32S2 arranged to lie in spaced-apart relation to one another to locate infant seat 34 therebetween as suggested in FIGS. 3-6. In illustrative embodiments, first side portion 32S1 includes a broad, low-profile, U-shaped solid panel 321 and a perforated panel 322 coupled to an upwardly facing U-shaped edge 321E of U-shaped solid panel 321 as suggested in FIG. 5. Second side portion 32S2 includes a broad, low-profile, U-shaped solid panel 323 and a perforated panel 324 coupled to an upwardly facing U-shaped edge 323E of U-shaped solid panel 323 as suggested in FIG. 4.

Infant seat 34 includes a seat bottom 341 and a seat back 342 arranged to extend upwardly away from seat bottom 341 as suggested in FIG. 3. Seat bottom 341 is arranged to extend upwardly along front portion 32F of side wall 32 and terminate in spaced-apart relation to top edge 32T and front collar 33F as suggested in FIG. 3. Seat back 342 is arranged to extend along bottom wall 31 and upwardly along rear portion 32R of side wall 32 and terminate in spaced-apart relation to top edge 32T and rear collar 33R as suggested in FIG. 3. Infant seat 34 is centered midway between first and second side portions 32S1, 32S2 of side wall 32 as suggested in FIG. 6.

Infant-support nest 36 is configured to provide interior padding for bottom wall 31, endless side wall 32, front and rear collars 33F, 33R, and infant seat 34 of carrier shell 30 as suggested in FIGS. 1-3. In illustrative embodiments, infant-support nest 36 comprises body-support pad 36P, first and second side pads 361, 362, and front pad 363 as shown, for example, in FIG. 3. Each of pads 360-363 is made of a suitable deformable material that is elastic in illustrative embodiments.

Body-support pad 360 of infant-support nest 36 comprises a seat bottom 3601 and a seat back 3602 arranged to extend upwardly from seat bottom 3601 as suggested in FIG. 3. When infant-support nest 36 is placed in interior region 301 of carrier shell 30 as suggested in FIGS. 3 and 9-11, seat bottom 3601 of body-support pad 360 is aligned with and arranged to cover the seat bottom 341 of the underlying infant seat 34 of carrier shell 30 and seat back 3602 of body-support pad 360 is aligned with and arranged to cover the seat back 342 of the underlying infant seat 34 of carrier shell 30.

First side pad 361 of infant-support nest 36 is formed to include an upwardly opening first strap-mount receiver 361R for receiving portions of first strap mount 41 therein when first strap mount 41 is coupled to perforated panel 322 of first side portion 32S1 as suggested in FIGS. 3-6 and 11. First side pad 361 of infant-support nest 36 is sized, shaped, and arranged to cover solid and perforated panels 321, 322 of first side portion 32S1 of side wall 32 when placed in interior region 301 of carrier shell 30.

Second side pad 362 of infant-support nest 36 is formed to include an upwardly opening second strap-mount receiver 362R for receiving portions of second strap mount 42 therein when second strap mount 42 is coupled to perforated panel 324 of second side portion 32S2 as suggested in FIGS. 3-6 and 12. Second side pad 362 of infant-support nest 36 is sized, shaped, and arranged to cover solid and perforated panels 323, 324 of second side portion 32S2 of side wall 32 when placed in interior region 301 of carrier shell 30.

Figure 13:
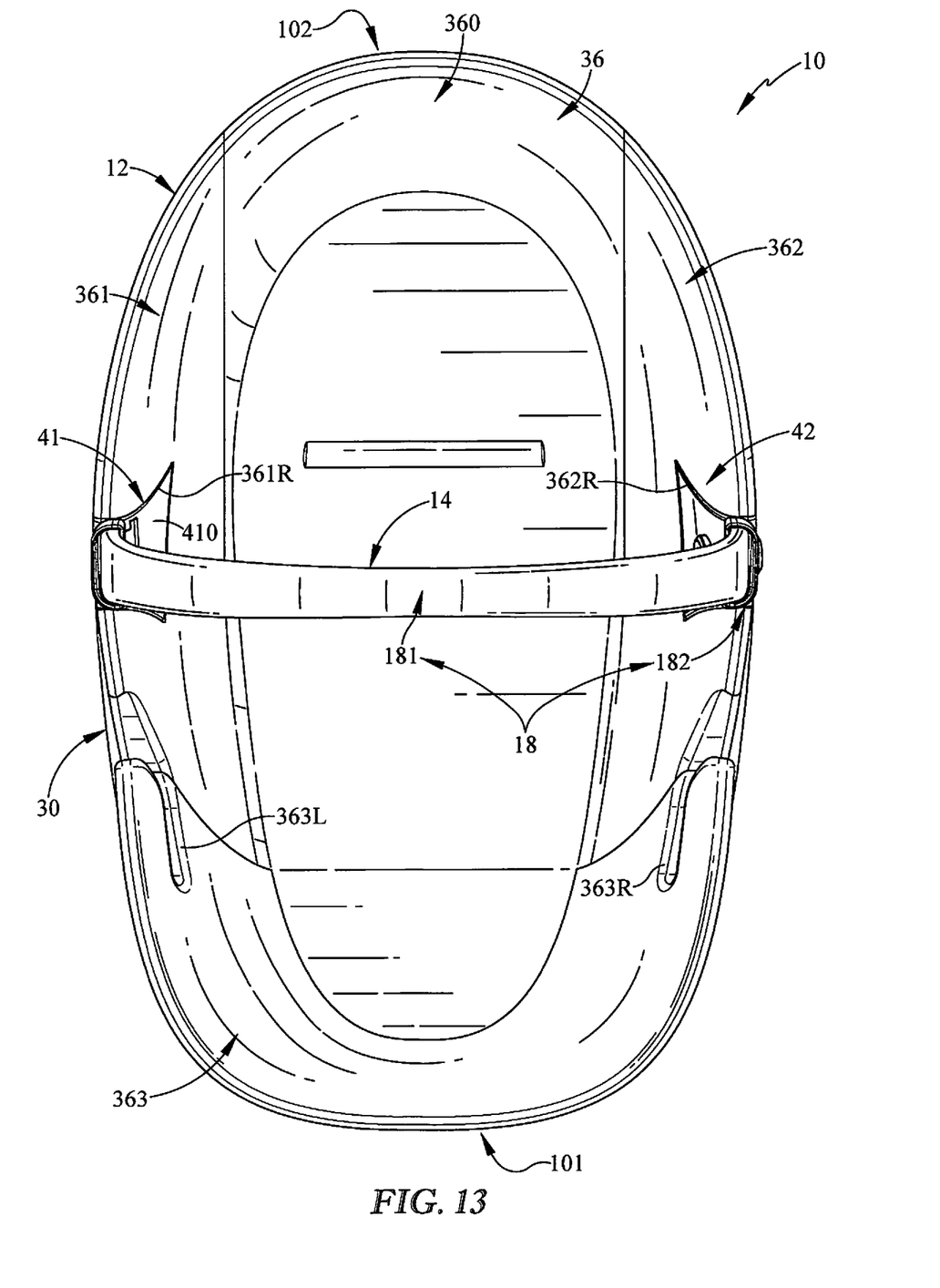
FIG. 13 is an enlarged top plan view of the infant carrier of FIG. 1.

Front pad 363 of infant-support nest 36 is formed to include two rearwardly opening belt-receiving guide slots 363L, 363R as suggested in FIG. 3. Front pad 363 of infant-support nest 36 is sized, shaped, and arranged to cover the front portion 32F and forward sections of first and second side portions 32S1, 32S2 of side wall 32 of carrier shell 30 as suggested in FIG. 13. Each of guide slots 363L, 363R is configured to receive a portion of a lap belt (not shown) included in a seat belt system included in vehicle 26.

Illustrative components included in short-height carry handle 14 are shown in FIG. 3. Carry handle 14 includes a first strap mount 41, a second strap mount 42, a hinge 43, a low-profile carry strap 181, and a buckle 182 as shown, for example, in FIG. 3.

First strap mount 41 includes a first base 410, a first anchor flange 411, and a hinge support 412 as shown in FIG. 3. First base 410 is sized to fit in the upwardly opening first strap-mount receiver 361R formed in first side pad 361 of infant-support nest 36 as suggested in FIGS. 3 and 13. First anchor flange 411 is coupled to a lower portion of first base 410 as suggested in FIG. 3 and is configured to mate with perforated panel 322 of first side portion 32S1 of side wall 32 of carrier shell 30 to support first base 410 in a stationary position on carrier shell 30 as suggested in FIG. 4. Hinge support 412 is coupled to an upper portion of first base 410 as suggested in FIG. 3 and is configured to mate with hinge 43 as suggested in FIGS. 3 and 4 to support hinge 43 for pivotable movement about lifter-pivot axis 18A as suggested in FIGS. 1-3. In an illustrative embodiment, hinge support 412 includes a first pivot axle 412A1 arranged to lie in spaced-apart relation to a second pivot axle 412A2 and to cooperate with second pivot axle 412A2 to provide means for supporting hinge 43 between axles 412A1, 412A2 for pivotable movement about lifter-pivot axis 18A.

Hinge 43 includes a pivotable base 431 mounted for pivotable movement on axles 412A1, 412A2 of hinge support 412 and a strap connector 432 as suggested in FIG. 3. Strap connector 432 is configured to mate with a first end 181E1 of carry strap 181 as suggested in FIGS. 1-3.

Low-profile carry strap 181 is made of a pliable material that is characterized by enough stiffness so that it generally maintains its shape during movement relative to seat bucket 12 as suggested in FIGS. 1 and 2 yet could deform in response to a sufficient impact. Carry strap 181 has a first end 181E1 coupled to hinge 43 and an opposite second end 181E2 coupled to buckle 182 as suggested in FIGS. 1-3.

Buckle 182 includes a downwardly extending plate 182P adapted to mate with second strap mount 42 as suggested in FIGS. 1 and 3 to tether the second end 181E2 of low-profile carry strap 181 to second strap mount 42 when low-profile carry strap 181 is in the closed infant-carrying position shown in FIG. 1. Buckle 182 also includes an upwardly extending strap connector 182C coupled to each of plate 182P and the second end 181E2 of low-profile carry strap 181 as suggested in FIGS. 1 and 3.

Second strap mount 42 includes a two-part second base 420, a second anchor flange 421, and a movable buckle-plate retainer 422 as shown in FIG. 3. Second base 420 is sized to fit in an upwardly opening second strap-mount receiver 362R formed in second side pad 362 of infant-support nest 36 as suggested in FIGS. 3 and 13. Second anchor flange 421 is coupled to a lower portion of second base 420 as suggested in FIG. 3 and is configured to mate with perforated panel 324 of second side portion 32S2 of side wall 32 of carrier shell 30 to support second base 420 in a stationary position on carrier shell 130 as suggested in FIG. 5. Second base 420 is formed to include an upwardly opening buckle-plate receiver 420R sized to receive plate 182P of buckle 182 therein as suggested in FIGS. 1 and 3. Buckle-plate retainer 422 is spring-loaded using any suitable spring means to extend through buckle-plate receiver 420R and a hole 182H formed in plate 182P and a hole 420H formed in second base 420 as suggested in FIGS. 1 and 3 to retain plate 182P in buckle-plate receiver 420R of second base 420 when low-profile carry strap 181 is moved to its closed infant-carrying position as suggested in FIGS. 1 and 3.

Short-height carry handle 14 is provided with a low-profile carry strap 181 to provide carry handle 14 with an effective width 14W that is greater than its effective strap height 14H as suggested in FIG. 9. When a caregiver grips low-profile carry strap 181 to carry seat bucket 12 away from its support base 20, seat bucket 12 is position to lie closer to the waist of the caregiver to create a desirable caregiver experience as compared to some traditional infant carriers provided with tall carry handles that cause the seat bucket to hang almost on the ground and bang against the legs of the person carrying the infant carrier. Such tall carry handles are needed as they must be mounted for pivotable movement about a pivot axis that extends laterally across the mid-section of the seat bucket to allow the tall carry handle to pivot forwardly to align with the front end of the seat bucket or rearwardly to align with the rear end of the seat bucket. In contrast, low-profile carry strap 181 of pivotable seat-bucket lifter 18 is configured to pivot about a lifter-pivot axis 18A that extends along one side of seat bucket 12 so that low-profile carry strap 181 moves laterally in direction 100 from one side of seat bucket 12 toward and past the other side of seat bucket 12 during movement from the closed infant-carrying position shown in FIG. 1 to an opened infant-receiving position shown in FIG. 2. Single hinge 43 is more compact than the traditional bulky pivot hubs that are provided at each end of a tall carry handle to mate with a seat bucket and support each end for rotation about a laterally extending pivot axis to allow forward and rearward pivoting of a tall carry handle.

Low-profile carry strap 181 is flexible and soft in illustrative embodiments to allow the caregiver carrying infant carrier 10 to have their arm close to their body aiding leverage to carry infant carrier 10 away from vehicle 26. The soft low-profile carry strap 181 naturally creates a broad evenly distributed point of contact with the caregiver's arm minimizing uncomfortable pressure spots. In illustrative embodiments, low-profile carrier strap 181 is made of one or more of foam, rubber, or thin fabric or plastics material layered together to form a tough but flexible low-profile carry strap 181. In alternative embodiments, such a low-profile carry strap in accordance with the present disclosure could be coupled permanently to opposite sides of seat bucket 12.

A child restraint 22 in accordance with the present disclosure includes an infant carrier 10 as suggested in FIG. 1. In illustrative embodiments, infant carrier 10 can be mounted on a stationary carrier-support base 20 that is anchored to a passenger seat 24 in a vehicle 26 to restrain an infant during transport in the vehicle 26 as suggested in FIG. 2.

Infant carrier 10 includes a seat bucket 12 sized to receive an infant and a short-height carry handle 14 coupled to seat bucket 12 as suggested in FIG. 1. Seat bucket 12 is configured to mate with carrier-support base 20 so that infant carrier 10 can be used in a vehicle 26 as suggested in FIG. 2. After seat bucket 12 is separated from carrier-support base 20 and removed from vehicle 26, a caregiver can use short-height carry handle 14 to move seat bucket 12 and transport an infant in seat bucket 12 away from vehicle 26.

Short-height carry handle 14 includes a low-profile carry strap 181 that is arranged to pivot between closed and opened positions about a pivot axis 18A that extends generally along one of the side walls of seat bucket 12 between front and rear ends 101, 102 of seat bucket 12 as suggested in FIGS. 1 and 2. In the closed infant-carrying position, the low-profile carry strap 181 is arranged to extend from the left side of seat bucket 12 over an infant-receiving space 16 formed in seat bucket 12 to the right side of seat bucket 12. In the opened infant-receiving position, the low-profile carry strap 181 is arranged to extend in a direction away from the left and right sides of seat bucket 12 so that it is an easy matter for a caregiver to place an infant in the infant-receiving space 16 formed in seat bucket 12.

Short-height carry handle 14 further includes a first strap mount 41 adapted to mate with a first side of a carrier shell 30 included in seat bucket 12, a hinge 43 coupled to first strap mount 41 to establish pivot axis 18A, and a second strap mount 42 adapted to mate with an opposite second side of carrier shell 30 of seat bucket 12. Short-height carry handle 14 includes a first end coupled to hinge 43 and an opposite second end coupled to a buckle 182 also included in the short-height carry handle 14. Carry handle 14 cooperates with buckle 182 to form a pivotable seat-bucket lifter 18 that can be (1) used by a caregiver to lift and transport seat bucket 12 when the low-profile carry strap 181 is retained in the closed infant-carrying position and (2) pivoted by a caregiver about the pivot axis 18A after release of buckle 182 from second strap mount 42 to allow the caregiver to move low-profile carry strap 181 to the opened infant-receiving position.

Child restraint 22 includes seat bucket 12 and short-height carry handle 14 as shown, for example, in FIG. 1. Seat bucket 12 is formed to include an infant-receiving space 16 that is sized to receive an infant and adapted to mate with a bucket-support base 20 that is anchored to a passenger seat in a vehicle 26 to restrain an infant during transport in a vehicle 26. Short-height carry handle 14 is coupled to seat bucket 12 and adapted to be used by a caregiver to move seat bucket 12 and transport an infant in seat bucket 12 away from vehicle 26 as suggested in FIG. 1.

Short-height carry handle 14 includes a low-profile carry 181 strap that is arranged as shown in FIGS. 1 and 9 to extend laterally over infant-receiving space 16 from a first contact point CP1 associated with a first side 11 of seat bucket 12 to a second CP2 contact point associated with an opposite second side 13 of seat bucket 12 to establish an effective strap width 14W of low-profile carry strap 181. Short-height carry handle 14 is also arranged to extend upwardly and vertically from a reference line RL extending laterally through first and second contact points CP1, CP2 to a highest point (HP) associated with low-profile carry strap 181 to establish an effective strap height 14H of low-profile carry strap 181 when short-height carry handle 14 occupies a closed infant-carrying position as suggested in FIG. 9. The effective strap width 14W is greater than the effective strap height 14H as suggested in FIG. 9.

Low-profile carry strap 181 is supported at first contact point CP1 as shown in FIG. 2 for lateral pivotable movement about a pivot axis 18A that extends along first side wall 11 of seat bucket 12 between front and rear ends 101, 102 of seat bucket 12 from the closed infant-carrying position (shown in FIG. 1) in a direction away from second side wall 13 of seat bucket 12 to an opened infant-seating position away from infant-receiving space 16 to allow a caregiver to place an infant in the infant-receiving space 16. Low-profile carry strap 181 is made of a pliable material that is characterized by sufficient stiffness so that it generally maintains its shape during pivoting movement about pivot axis 18A as suggested in FIGS. 1 and 2.

Figures 4, 5, 6:
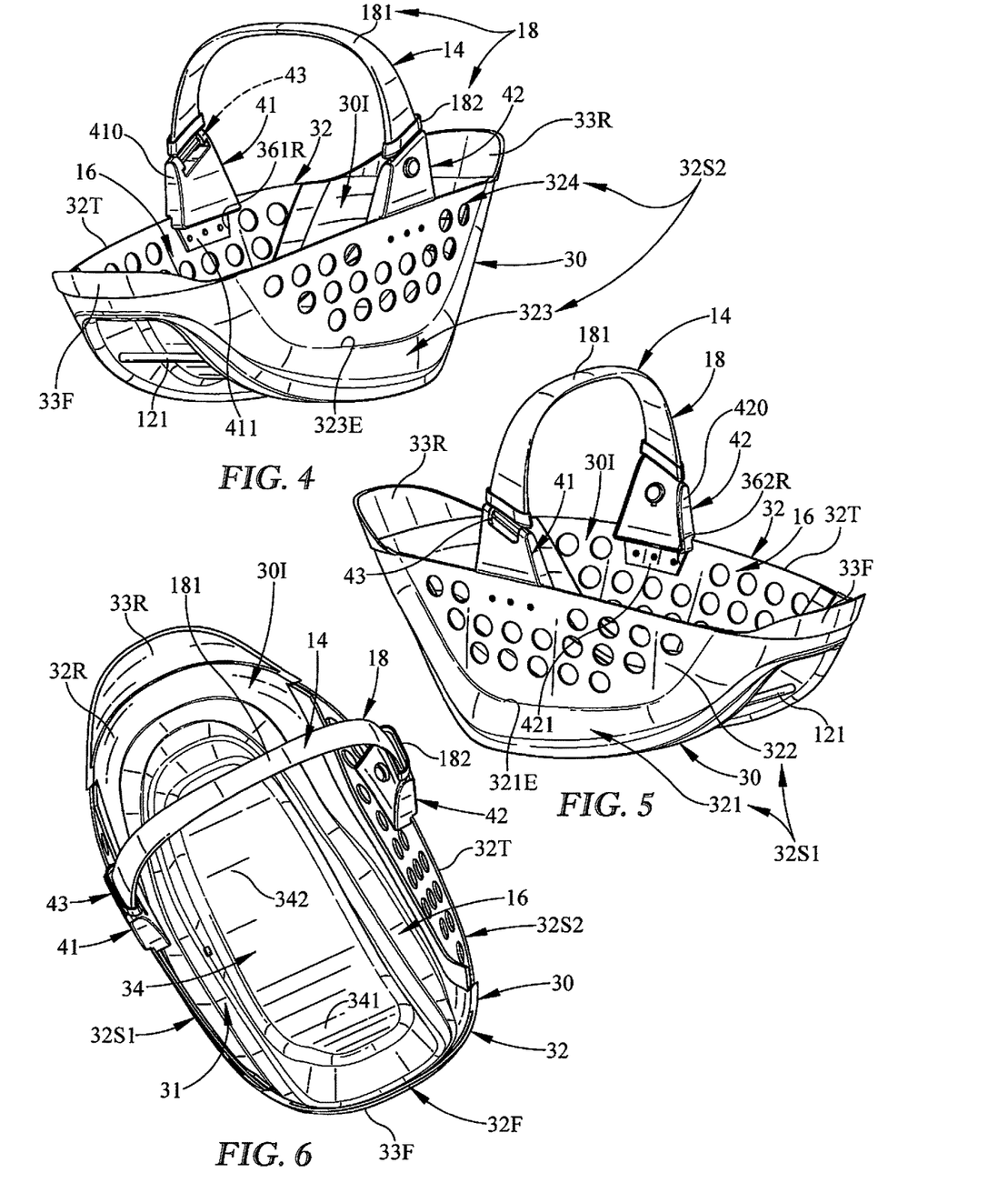
FIG. 4 is a perspective view of the carrier shell of FIG. 3 after the short-height carry handle has been assembled and coupled to opposing first and second side walls of the carrier shell of the seat bucket.
FIG. 5 is another perspective view of the short-height carry handle and the carrier shell of the seat bucket.
FIG. 6 is a top perspective view of the handle and shell of FIGS. 4 and 5 showing that the carrier shell of the seat bucket is formed to include an upwardly opening interior region sized to receive therein the four interior pad components comprising the infant-support nest shown in FIG. 3.
Figure 7:
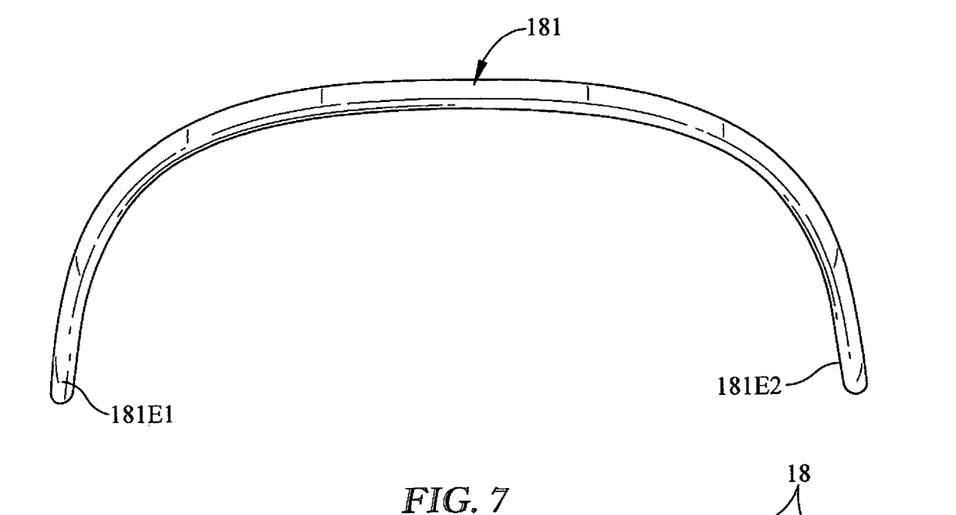
FIG. 7 is an enlarged front elevation view of the carry strap shown in FIGS. 1, 3, and 9.
Figure 8:
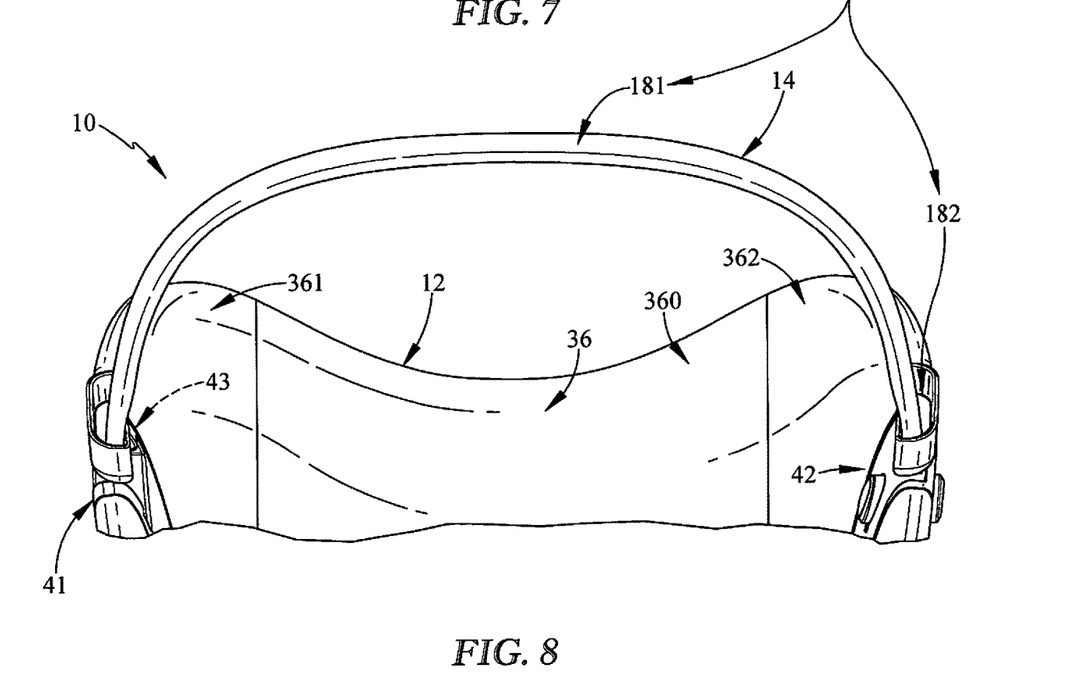
FIG. 8 is an enlarged front elevation view of the short-height carry handle shown in FIGS. 1 and 9.

Seat bucket 12 includes a carrier shell 30 formed to include an interior region 301 containing infant-receiving space 16 as shown in FIGS. 3 and 4. Short-height carry handle 14 further includes a first strap mount 41 coupled to a first side of carrier shell 30 that is included in first side 11 of seat bucket 12, a hinge 43 coupled to first strap mount 41 at first contact point CP1 to establish pivot axis 18A, and a second strap mount 42 coupled to an opposite second side of carrier shell 30 that is included in the second side 13 of seat bucket 12 and arranged to provide second contact point CP2 as suggested in FIGS. 1 and 2. Low-profile carry strap 181 has a first end 18E1 coupled to hinge 43 at first contact point CP1 and an opposite second end 181E2 that is associated with second contact point CP2 on second strap mount 42 when short-height carry handle 14 occupies the closed infant-carrying position as suggested in FIG. 9.

Short-height carry handle 14 further includes a buckle 182 that is coupled to the opposite second end 181E2 of low-profile carry strap 181 as suggested in FIGS. 2 and 3. Buckle 182 is configured to mate with second strap mount 42 at second contact point CP2 when short-height carry handle 14 occupies the closed infant-carrying position as suggested in FIG. 9. Low-profile carry strap 181 cooperates with buckle 182 to form a pivotable seat-bucket lifter 18 that can be used by a caregiver to lift and transport seat bucket 12 as suggested in FIG. 1 when low-profile carry strap 181 is retained in the closed infant-carrying position. Pivotable seat-bucket lifter 18 can be pivoted by the caregiver about pivot axis 18A after release of buckle 182 from second strap mount 42 to allow the caregiver to move low-profile carry strap 181 laterally to the opened infant-receiving position as suggested in FIG. 2.

Carrier shell 30 includes a bottom wall 31 and an endless side wall 32 as suggested in FIG. 3. Endless side wall 32 extends upwardly from bottom wall 31, surrounds interior region 301, terminates at a top edge 32T, and provides first and second sides 32S1, 32S2 of carrier shell 30. First and second strap mounts 41, 42 are coupled to endless side wall 32 to locate first and second contact points CP1, CP2 above and in spaced-apart relation to top edge 32T of endless side wall 32 and cause first and second ends 181E1, 181E2 of low-profile carry handle 181 to lie above and in spaced-apart relation to top edge 32T when low-profile carry handle 181 occupies the closed infant-carrying position as suggested in FIGS. 3-5.

Child restraint 22 further includes an infant-support nest 36 located in interior region 301 of carrier shell 30 as suggested in FIG. 1. Infant-support nest 36 is formed to provide an infant-receiving space 16 that is located below low-profile carry handle 101 when low-profile carry handle 101 occupies the closed infant-carrying position. Infant-support nest 36 is made of a shock-absorbing cushioning material and formed to include an upwardly opening first strap-mount receiver 361R configured to receive portions of first strap mount 41 therein and an upwardly opening second strap-mount receiver 362R configured to receive portions of second strap mount 42 therein as suggested in FIGS. 3-5.

First strap mount 41 includes a first base 410 located above carrier shell 30 and a first anchor flange 411 coupled to a lower portion of first base 410 and mated with first side of carrier shell 30 to retain first base 410 in a stationary position relative to carrier shell 30 as suggested in FIGS. 3-5. First strap mount 42 also includes a hinge support 412 coupled to an upper portion of the first base 410 and configured to mate with the hinge 43 to support hinge 43 for pivotable movement about pivot axis 18A as suggested in FIGS. 1-3.

Hinge 43 includes a pivotable base 43B and a strap connector 43C as shown in FIG. 3. Pivotable base 43B is mounted for pivotable movement on hinge support 412. Strap connector 43C is coupled to the first end 181E1 of low-profile carry strap 181 at first contact point CP1.

Second strap mount 42 includes a second base 420 located above carrier shell 30 and a second anchor flange 421 coupled to a lower portion of second base 420 and mated with second side of carrier shell 30 to retain second base 420 in a stationary position relative to carrier shell 30 as suggested in FIGS. 1 and 5. An upper portion of second base 420 provides the second contact point CP2 as suggested in FIG. 2.

The upper portion of second base 420 is formed to include an upwardly opening buckle-plate receiver 420R sized to receive a plate 182P of a buckle 182 coupled to second end 181E2 of low-profile carry strap 181 as suggested in FIG. 3. Second strap mount 42 further includes a buckle-plate retainer 422 coupled to upper portion of second base 420. Second strap mount 42 is configured to mate with plate 182P of buckle 182 in the upwardly opening buckle-plate receiver 420R to retain the second end 181E2 of the low-profile carry strap 181 at second contact point CP2 when low-profile carry strap 181 occupies the closed infant-carrying position.

The effective strap width 14W of low-profile carry strap 181 is about 2.4 times greater than the effective strap height 14H of low-profile carry strap 181 as suggested in FIG. 9. A measured strap height 181H between the highest point (HP) associated low-profile carry strap 181 and grounds underlying and supporting seat bucket 12 when low-profile carry strap 181 occupies the closed infant-carrying position is about 2.7 times greater than the effective strap height 14H of low-profile carry strap as shown, for example, in FIG. 9.

Carry handle 14 is coupled at each end thereof to seat bucket 12 to allow a caregiver to carry seat bucket 12 using carry handle 14 as shown in FIG. 1. Carry handle 14 includes a first mount 41 coupled to a first side 11 of seat bucket 12, a second mount 42 coupled to an opposite second side 13 of seat bucket 12, a hinge 43 coupled to first mount 41, and a pivotable seat-bucket lifter 18 as shown in FIG. 1. Pivotable seat-bucket lifter 18 includes a first end coupled to hinge 43 to support the pivotable seat-bucket lifter 18 for pivotable movement about a lifter-pivot axis 18A from a closed infant-carrying position in which an opposite second end of the pivotable seat-bucket lifter 18 is mated with second mount 42 to an opened infant-seating position in which the opposite second end is arranged to lie in spaced-apart location to second mount 42 to locate first mount 41 therebetween as suggested in FIGS. 1 and 2.

Hinge 43 is arranged to cause the lifter-pivot axis 18A to extend along first side 11 of seat bucket 12 as suggested in FIG. 1. The pivotable seat-bucket lifter 18 is arranged to extend in a first direction from first side 11 of seat bucket 12 over infant-receiving space 16 to second side 13 of seat bucket 12 in the closed infant-carrying position as suggested in FIG. 1 and in another direction away from first and second sides 11, 13 of seat bucket 12 in the opened infant-receiving position as suggested in FIG. 2.

Seat bucket 12 includes a carrier shell 30 made of a plastics material and configured to mate with first and second mounts 41, 42 of carry handle 14 to support those mounts 41, 42 in stationary positions on seat bucket 12 as suggested in FIGS. 4-6. Seat bucket 12 also includes an infant-support nest 36 made of a softgoods material and coupled to carrier shell 30 to provide infant-receiving space 16. Infant-support nest 36 is formed to include a first mount cutout 361R located along first side 11 of seat bucket 12 to receive therein a portion of first mount 41 of carry handle 14 and a second mount cutout 362R located along second side 13 of seat bucket 12 to receive therein a portion of second mount 42 of carry handle 14 as suggested in FIG. 3.

A carrier-support base 20 is also included in child restraint 10 as suggested in FIG. 2 and is adapted to be anchored to a passenger seat 24 in a vehicle 26. First and second bucket-support attachment rods 121, 122 are included in child restraint 10 and are mounted on the underside of carrier shell 30 and configured to mate with carrier-support base 20 to hold seat bucket 12 in a stationary position on carrier-support base 20 as suggested in FIG. 2.

Infant-support nest 36 comprises a first side pad 361 formed to include the first mount cutout 361R, an opposite second side pad 362 formed to include the second mount cutout, a body-support pad 360 arranged to extend between the first and second side pads 361, 362 as suggested in FIG. 3. Infant-support nest 36 also includes a front pad 363 coupled to each of the first side, body-support, and second side pads 361, 360, 362.

The pivotable seat-bucket lifter 18 includes a carry strap 181 made of a pliable material that is characterized by sufficient stiffness so that it generally maintains its shape during movement of the pivotable seat-bucket lifter 18 relative to seat bucket 12 as suggested in FIGS. 1 and 2. Carry strap 181 includes a first end 181E1 coupled to hinge 43 and an opposite second end 181E2 that is coupled to a buckle 182 that is included in the pivotable seat-bucket lifter 18 and configured to mate with second mount 42 upon movement of the pivotable seat-bucket lifter 18 to the closed infant-carrying position. Carry strap 181 is arranged to extend laterally from first mount 41 to second mount 42 in the closed infant-carrying position to establish an effective strap width 14W of carry strap 181 and to extend upwardly and vertically away from the reference line (RL) extending laterally between first and second mounts 41, 42 to establish an effective strap height 14H of carry strap 181 as suggested in FIG. 9. The effective strap width 14W is greater than the effective strap height 14H as suggested in FIG. 9.

The invention claimed is:

1. A child restraint comprising
a seat bucket formed to include an infant-receiving space and
a carry handle coupled at each end thereof to the seat bucket to allow a caregiver to carry the seat bucket using the carry handle, the carry handle including a first mount coupled to a first side of the seat bucket, a second mount coupled to an opposite second side of the seat bucket, a hinge coupled to the first mount, and a pivotable seat-bucket lifter including a first end coupled to the hinge to support the pivotable seat-bucket lifter for pivotable movement about a lifter-pivot axis from a closed infant-carrying position in which an opposite second end of the pivotable seat-bucket lifter is mated with the second mount to an opened infant-seating position in which the opposite second end is arranged to lie in spaced-apart location to the second mount to locate the first mount therebetween,
wherein the seat bucket includes a carrier shell made of a plastics material and configured to mate with the first and second mounts of the carry handle to support those mounts in stationary positions on the seat bucket, the seat bucket also includes an infant-support nest made of a softgoods material and coupled to the carrier shell to provide the infant-receiving space, and the infant-support nest is formed to include a first mount cutout located along the first side of the seat bucket to receive therein a portion of the first mount of the carry handle and a second mount cutout located along the second side of the seat bucket to receive therein a portion of the second mount of the carry handle.

2. The child restraint of claim 1, further comprising a carrier-support base that is adapted to be anchored to a passenger seat in a vehicle and first and second bucket-support attachment rods that are mounted on the underside of the carrier shell and configured to mate with the carrier-support base to hold the seat bucket in a stationary position on the carrier-support base.

3. The child restraint of claim 1, wherein the infant-support nest comprises a first side pad formed to include the first mount cutout, an opposite second side pad formed to include the second mount cutout, a body-support pad arranged to extend between the first and second side pads, and a front pad coupled to each of the first side, body-support, and second side pads.

4. A child restraint comprising
a seat bucket formed to include an infant-receiving space that is sized to receive an infant and adapted to mate with a bucket-support base that is anchored to a passenger seat in a vehicle to restrain an infant during transport in a vehicle and
a short-height carry handle coupled to the seat bucket and adapted to be used by a caregiver to move the seat bucket and transport an infant in the seat bucket away from the vehicle, the short-height carry handle including a low-profile carry strap that is arranged to extend laterally over the infant-receiving space from a first contact point associated with a first side of the seat bucket to a second contact point associated with an opposite second side of the seat bucket to establish an effective strap width of the low-profile carry strap and to extend upwardly and vertically from a reference line extending laterally through the first and second contact points to a highest point associated with the low-profile carry strap to establish an effective strap height of the low-profile carry strap when the short-height carry handle occupies a closed infant-carrying position, and wherein the effective strap width is greater than the effective strap height,
wherein the low-profile carry strap is supported at the first contact point for lateral pivotable movement about a pivot axis that extends along the first side wall of the seat bucket between front and rear ends of the seat bucket from the closed infant-carrying position in a direction away from the second side wall of the seat bucket to an opened infant-seating position away from the infant-receiving space to allow a caregiver to place an infant in the infant-receiving space,
wherein the seat bucket includes a carrier shell formed to include an interior region containing the infant-receiving space and the short-height carry handle further includes a first strap mount coupled to a first side of the carrier shell that is included in the first side of the seat bucket, a hinge coupled to the first strap mount at the first contact point to establish the pivot axis, and a second strap mount coupled to an opposite second side of the carrier shell that is included in the second side of the seat bucket and arranged to provide the second contact point, and the low-profile carry strap has a first end coupled to the hinge at the first contact point and an opposite second end that is associated with the second contact point on the second strap mount when the short-height carry handle occupies the closed infant-carrying position, and
wherein the short-height carry handle further includes a buckle that is coupled to the opposite second end of the low-profile carry strap and is configured to mate with the second strap mount at the second contact point when the short-height carry handle occupies the closed infant-carrying position and the low-profile carry strap cooperates with the buckle to form a pivotable seat-bucket lifter that can be used by a caregiver to lift and transport the seat bucket when the low-profile carry strap is retained in the closed infant-carrying position and pivoted by the caregiver about the pivot axis after release of the buckle from the second strap mount to allow the caregiver to move the low-profile carry strap laterally to the opened infant-receiving position.

5. A child restraint comprising a seat bucket formed to include an infant-receiving space that is sized to receive an infant and adapted to mate with a bucket-support base that is anchored to a passenger seat in a vehicle to restrain an infant during transport in a vehicle and a short-height carry handle coupled to the seat bucket and adapted to be used by a caregiver to move the seat bucket and transport an infant in the seat bucket away from the vehicle, the short-height carry handle including a low-profile carry strap that is arranged to extend laterally over the infant-receiving space from a first contact point associated with a first side of the seat bucket to a second contact point associated with an opposite second side of the seat bucket to establish an effective strap width of the low-profile carry strap and to extend upwardly and vertically from a reference line extending laterally through the first and second contact points to a highest point associated with the low-profile carry strap to establish an effective strap height of the low-profile carry strap when the short-height carry handle occupies a closed infant-carrying position, and wherein the effective strap width is greater than the effective strap height, wherein the low-profile carry strap is supported at the first contact point for lateral pivotable movement about a pivot axis that extends along the first side wall of the seat bucket between front and rear ends of the seat bucket from the closed infant-carrying position in a direction away from the second side wall of the seat bucket to an opened infant-seating position away from the infant-receiving space to allow a caregiver to place an infant in the infant-receiving space, wherein the seat bucket includes a carrier shell formed to include an interior region containing the infant-receiving space and the short-height carry handle further includes a first strap mount coupled to a first side of the carrier shell that is included in the first side of the seat bucket, a hinge coupled to the first strap mount at the first contact point to establish the pivot axis, and a second strap mount coupled to an opposite second side of the carrier shell that is included in the second side of the seat bucket and arranged to provide the second contact point, and the low-profile carry strap has a first end coupled to the hinge at the first contact point and an opposite second end that is associated with the second contact point on the second strap mount when the short-height carry handle occupies the closed infant-carrying position, wherein the second strap mount includes a second base located above the carrier shell and a second anchor flange coupled to a lower portion of the second base and mated with the second side of the carrier shell to retain the second base in a stationary position relative to the carrier shell, and an upper portion of the second base provides the second contact point, and wherein the upper portion of the second base is formed to include an upwardly opening buckle-plate receiver sized to receive a plate of a buckle coupled to the second end of the low-profile carry strap and the second strap mount further includes a buckle-plate retainer coupled to the upper portion of the second base and configured to mate with the plate of the buckle in the upwardly opening buckle-plate receiver to retain the second end of the low-profile carry strap at the second contact point when the low-profile carry strap occupies the closed infant-carrying position.

6. A child restraint comprising a seat bucket formed to include an infant-receiving space that is sized to receive an infant and adapted to mate with a bucket-support base that is anchored to a passenger seat in a vehicle to restrain an infant during transport in a vehicle and a short-height carry handle coupled to the seat bucket and adapted to be used by a caregiver to move the seat bucket and transport an infant in the seat bucket away from the vehicle, the short-height carry handle including a low-profile carry strap that is arranged to extend laterally over the infant-receiving space from a first contact point associated with a first side of the seat bucket to a second contact point associated with an opposite second side of the seat bucket to establish an effective strap width of the low-profile carry strap and to extend upwardly and vertically from a reference line extending laterally through the first and second contact points to a highest point associated with the low-profile carry strap to establish an effective strap height of the low-profile carry strap when the short-height carry handle occupies a closed infant-carrying position, and wherein the effective strap width is greater than the effective strap height, wherein the low-profile carry strap is supported at the first contact point for lateral pivotable movement about a pivot axis that extends along the first side wall of the seat bucket between front and rear ends of the seat bucket from the closed infant-carrying position in a direction away from the second side wall of the seat bucket to an opened infant-seating position away from the infant-receiving space to allow a caregiver to place an infant in the infant-receiving space, wherein the seat bucket includes a carrier shell formed to include an interior region containing the infant-receiving space and the short-height carry handle further includes a first strap mount coupled to a first side of the carrier shell that is included in the first side of the seat bucket, a hinge coupled to the first strap mount at the first contact point to establish the pivot axis, and a second strap mount coupled to an opposite second side of the carrier shell that is included in the second side of the seat bucket and arranged to provide the second contact point, and the low-profile carry strap has a first end coupled to the hinge at the first contact point and an opposite second end that is associated with the second contact point on the second strap mount when the short-height carry handle occupies the closed infant-carrying position, wherein the carrier shell includes a bottom wall and an endless side wall extending upwardly from the bottom wall, surrounding the interior region, terminating at a top edge, and providing the first and second sides of the carrier shell, the first and second strap mounts are coupled to the endless side wall to locate the first and second contact points above and in spaced-apart relation to the top edge of the endless side wall and cause the first and second ends of the low-profile carry handle to lie above and in spaced-apart relation to the top edge when the short-height carry handle occupies the closed infant-carrying position, and wherein the child restraint further comprises an infant-support nest located in the interior region of the carrier shell and formed to provide an infant-receiving space that is located below the low-profile carry handle when the low-profile carry handle occupies the closed infant-carrying position and wherein the infant-support nest is made of a shock-absorbing cushioning material and formed to include an upwardly opening first strap-mount receiver configured to receive portions of the first strap mount therein and an upwardly opening second strap-mount receiver configured to receive portions of the second strap mount therein.

7. A child restraint comprising
a seat bucket formed to include an infant-receiving space that is sized to receive an infant and adapted to mate with a bucket-support base that is anchored to a passenger seat in a vehicle to restrain an infant during transport in a vehicle and
a short-height carry handle coupled to the seat bucket and adapted to be used by a caregiver to move the seat bucket and transport an infant in the seat bucket away from the vehicle, the short-height carry handle including a low-profile carry strap that is arranged to extend laterally over the infant-receiving space from a first contact point associated with a first side of the seat bucket to a second contact point associated with an opposite second side of the seat bucket to establish an effective strap width of the low-profile carry strap and to extend upwardly and vertically from a reference line extending laterally through the first and second contact points to a highest point associated with the low-profile carry strap to establish an effective strap height of the low-profile carry strap when the short-height carry handle occupies a closed infant-carrying position, and wherein the effective strap width is greater than the effective strap height,
wherein the low-profile carry strap is supported at the first contact point for lateral pivotable movement about a pivot axis that extends along the first side wall of the seat bucket between front and rear ends of the seat bucket from the closed infant-carrying position in a direction away from the second side wall of the seat bucket to an opened infant-seating position away from the infant-receiving space to allow a caregiver to place an infant in the infant-receiving space,
wherein the seat bucket includes a carrier shell formed to include an interior region containing the infant-receiving space and the short-height carry handle further includes a first strap mount coupled to a first side of the carrier shell that is included in the first side of the seat bucket, a hinge coupled to the first strap mount at the first contact point to establish the pivot axis, and a second strap mount coupled to an opposite second side of the carrier shell that is included in the second side of the seat bucket and arranged to provide the second contact point, and the low-profile carry strap has a first end coupled to the hinge at the first contact point and an opposite second end that is associated with the second contact point on the second strap mount when the short-height carry handle occupies the closed infant-carrying position,
wherein the first strap mount includes a first base located above the carrier shell, a first anchor flange coupled to a lower portion of the first base and mated with the first side of the carrier shell to retain the first base in a stationary position relative to the carrier shell, and a hinge support coupled to an upper portion of the first base and configured to mate with the hinge to support the hinge for pivotable movement about the pivot axis, and
wherein the hinge includes a pivotable base mounted for pivotable movement on the hinge support and a strap connector coupled to the first end of the low-profile carry strap at the first contact point.

8. A child restraint comprising
a seat bucket formed to include an infant-receiving space and
a carry handle coupled at each end thereof to the seat bucket to allow a caregiver to carry the seat bucket using the carry handle, the carry handle including a first mount coupled to a first side of the seat bucket, a second mount coupled to an opposite second side of the seat bucket, a hinge coupled to the first mount, and a pivotable seat-bucket lifter including a first end coupled to the hinge to support the pivotable seat-bucket lifter for pivotable movement about a lifter-pivot axis from a closed infant-carrying position in which an opposite second end of the pivotable seat-bucket lifter is mated with the second mount to an opened infant-seating position in which the opposite second end is arranged to lie in spaced-apart location to the second mount to locate the first mount therebetween,
wherein the pivotable seat-bucket lifter includes a carry strap made of a pliable material that is characterized by sufficient stiffness so that it generally maintains its shape during movement of the pivotable seat-bucket lifter relative to the seat bucket, the carry strap includes a first end coupled to the hinge and an opposite second end that is coupled to a buckle that is included in the pivotable seat-bucket lifter and configured to mate with the second mount upon movement of the pivotable seat-bucket lifter to the closed infant-carrying position.

9. The child restraint of claim 8, wherein the carry strap is arranged to extend laterally from the first mount to the second mount in the closed infant-carrying position to establish an effective strap width of the carry strap and to extend upwardly and vertically away from the reference line extending laterally between the first and second mounts to establish an effective strap height of the carry strap and wherein the effective strap width is greater than the effective strap height.

* * * * *